United States Patent
Yao et al.

(10) Patent No.: US 12,278,660 B2
(45) Date of Patent: Apr. 15, 2025

(54) PDMA COMMUNICATION SYSTEM BASED ON OPTIMAL FREQUENCY-HOPPING PATTERNS

(71) Applicant: Nanjing University of Posts and Telecommunications, Jiangsu (CN)

(72) Inventors: Jianguo Yao, Jiangsu (CN); Jun Ge, Jiangsu (CN); Ziwei Liu, Jiangsu (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 0 days.

(21) Appl. No.: 18/624,139

(22) Filed: Apr. 2, 2024

(65) Prior Publication Data

US 2024/0250711 A1 Jul. 25, 2024

Related U.S. Application Data

(63) Continuation-in-part of application No. PCT/CN2022/126201, filed on Oct. 19, 2022.

(30) Foreign Application Priority Data

Nov. 15, 2021 (CN) .......................... 202111353036.4

(51) Int. Cl.
*H04B 1/713* (2011.01)
*H04L 5/00* (2006.01)

(52) U.S. Cl.
CPC ........... *H04B 1/713* (2013.01); *H04L 5/0007* (2013.01)

(58) Field of Classification Search
CPC .............................. H04L 5/0012; H04B 1/713
See application file for complete search history.

(56) References Cited

U.S. PATENT DOCUMENTS 11,012,978 B2 * 5/2021 Li .......................... H04L 5/0035
2017/0257138 A1 9/2017 Shih et al.

FOREIGN PATENT DOCUMENTS

| CN | 109361426 | 2/2019 |
| CN | 114039625 | 2/2022 |

OTHER PUBLICATIONS

Ming Jiang, "Optimal Frequency Hopping Patterns and Its Application Research in MIMO Cellular Mobile Communication System", Thesis Submitted to Nanjing University of Posts and Telecommunications for the Degree of Master of Engineering, Mar. 2019, with English abstract, pp. 1-63.

(Continued)

*Primary Examiner* — Kevin Kim
(74) *Attorney, Agent, or Firm* — JCIPRNET (57) ABSTRACT

Provided is a pattern division multiple access (PDMA) communication system based on optimal frequency-hopping patterns, which includes a transmitter and a receiver. The transmitter modulates an input baseband signal into a modulated signal, and then converts the modulated signal into a signal that hops in frequency according to the optimal frequency-hopping pattern. The receiver reverts the received frequency-hopping signal to an output modulated signal using an optimal frequency-hopping pattern same as that of the transmitter, and then demodulates the modulated signal into a baseband signal. The optimal frequency-hopping patterns are obtained by applying two-dimensional cyclic shift to a Golomb Costas array constructed based on an extension field, and thus are frequency-hopping patterns with ideal autocorrelation and cross-correlation properties.

7 Claims, 4 Drawing Sheets

(56) References Cited

OTHER PUBLICATIONS

"International Search Report (Form PCT/ISA/210) of PCT/CN2022/126201", mailed on Dec. 15, 2022, with English translation thereof, pp. 1-4.

"Written Opinion of the International Searching Authority (Form PCT/ISA/237) of PCT/CN2022/126201", mailed on Dec. 15, 2022, pp. 1-4.

* cited by examiner

Golomb Costas array *A* based on an extension field

FIG. 2a

Array $A_1$ obtained after adding an "empty" column and an "empty" row to the array *A*

FIG. 2b

Array $A_2$ obtained after an upward cyclic shift of the array $A_1$ by two rows

FIG. 2c

Array $A_3$ obtained after an upward cyclic shift of the array $A_1$ by four rows

FIG. 2d

Array $A_4$ obtained after an upward cyclic shift of the array $A_1$ by six rows

FIG. 2e

Frequency-hopping pattern 1 (the family head frequency-hopping pattern) of the first optimal frequency-hopping pattern family

FIG. 3a

Frequency-hopping pattern 2 of the first optimal frequency-hopping pattern family

FIG. 3b

Frequency-hopping pattern 3 of the first optimal frequency-hopping pattern family

FIG. 3c

Frequency-hopping pattern 4 of the first optimal frequency-hopping pattern family

PDMA COMMUNICATION SYSTEM BASED ON OPTIMAL FREQUENCY-HOPPING PATTERNS

CROSS-REFERENCE TO RELATED APPLICATION

This application is a continuation-in-part application of international PCT application serial no. PCT/CN2022/126201, filed on Oct. 19, 2022, which claims the priority benefit of China application no. 202111353036.4, filed on Nov. 15, 2021. The entirety of each of the above mentioned patent applications is hereby incorporated by reference herein and made a part of this specification.

BACKGROUND

Technical Field

The present invention relates to a pattern division multiple access (PDMA) communication system based on optimal frequency-hopping patterns.

Description of Related Art

Cellular mobile communication systems are interference-limited. That is, the interference in the system is far greater than the background noise, so that the increase in the number of users in the system is mainly limited by the degree of interference. Therefore, any multiple access technology that can reduce interference can directly improve the system capacity and performance.

The first-generation cellular mobile communication system (1G) employs the frequency division multiple access (FDMA) technology, the second-generation cellular mobile communication system (2G) employs the time division multiple access (TDMA) technology, and the third-generation cellular mobile communication system (3G) employs the code division multiple access (CDMA) technology.

The foregoing FDMA, TDMA, and CDMA multiple access technologies all belong to one-dimensional orthogonal multiple access technologies, and are unable to overcome the interference caused by multipath propagation and Doppler shift in the mobile communication system.

The foregoing problem is an extremely important problem that should be considered and solved in the design process of a multiple access communication system.

SUMMARY

The present invention aims to provide a PDMA communication system based on optimal frequency-hopping patterns, so as to solve the problem in the prior art that the one-dimensional orthogonal multiple access technology cannot overcome the interference caused by multipath propagation and Doppler shift in the mobile communication system.

The technical solution of the present invention is as follows:

A PDMA communication system based on optimal frequency-hopping patterns includes a transmitter and a receiver, where the transmitter modulates an input baseband signal into a modulated signal, and then converts the modulated signal into a signal that hops in frequency according to the optimal frequency-hopping pattern; and the receiver reverts the received frequency-hopping signal to an output modulated signal using an optimal frequency-hopping pattern same as that of the transmitter, and then demodulates the modulated signal into a baseband signal, the optimal frequency-hopping patterns being obtained by applying two-dimensional cyclic shift to a Golomb Costas array constructed based on an extension field and thus being frequency-hopping patterns with ideal autocorrelation and cross-correlation properties.

Further, the transmitter includes a first optimal frequency-hopping pattern generator, a first frequency synthesizer, a digital modulator, a first mixer, a first filter, a power amplifier, and a first antenna,
  the first optimal frequency-hopping pattern generator is configured to generate an optimal frequency-hopping pattern;
  the first frequency synthesizer is configured to map the optimal frequency-hopping pattern into a frequency-hopping carrier such that an original constant frequency carrier is replaced with a hopping frequency carrier under the control of the first optimal frequency-hopping pattern generator, to generate a first local frequency-hopping signal;
  the digital modulator is configured to modulate an input digital baseband signal;
  the first mixer is configured to perform frequency mixing on the first local frequency-hopping signal and the modulated signal output by the digital modulator, and move the frequency spectrum of the modulated signal onto the frequency-hopping carrier;
  the first filter is configured to filter out harmonics and clutter from a signal output by the first mixer; and
  the power amplifier is configured to amplify a signal output by the first filter, where an obtained frequency-hopping signal is transmitted via the first antenna as a transmit signal.

Further, the receiver includes a second antenna, a second optimal frequency-hopping pattern generator, a second frequency synthesizer, a second mixer, a second filter, and a digital demodulator,
  the second optimal frequency-hopping pattern generator is configured to generate an optimal frequency-hopping pattern same as that of the transmitter;
  the second frequency synthesizer is configured to map the optimal frequency-hopping pattern into a frequency-hopping carrier such that an original constant frequency carrier is replaced with a hopping frequency carrier under the control of the second optimal frequency-hopping pattern generator, to generate a second local frequency-hopping signal;
  the second mixer is configured to perform frequency mixing on the second local frequency-hopping signal and a frequency-hopping signal received by the second antenna, to move the signal spectrum back to the subcarrier without distortion;
  the second filter is configured to filter out harmonics and clutter from a signal output by the second mixer; and
  the digital demodulator is configured to demodulate a signal output by the second filter, to output a digital baseband signal.

Further, the optimal frequency-hopping patterns are obtained by applying the two-dimensional cyclic shift to the Golomb Costas array constructed based on the extension field, which is specifically as follows:
  determining the order N of the Golomb Costas array, and constructing the Golomb Costas array based on the extension field;
  generating the family head frequency-hopping pattern of an optimal frequency-hopping pattern family; and generating other frequency-hopping patterns in each optimal frequency-hopping pattern family from the family head frequency-hopping pattern.

Further, the determining the order N of the Golomb Costas array is specifically as follows:

for application in a cellular mobile communication system, according to the maximum Doppler shift $d_{max}$ of the cellular mobile communication system with $d_{max}$ being a nonnegative integer, determining the minimum Doppler distance w between optimal frequency-hopping pattern families by virtue of $d_{max} \leq w-1$; and determining the number s of the optimal frequency-hopping pattern families according to the number of cells in a cluster, the number s of the optimal frequency-hopping pattern families being not less than the number of cells in the cluster;

according to the maximum multipath delay $\tau_{max}$ in a cell with $\tau_{max}$ being a nonnegative integer, determining the minimum delay distance $w_1$ between frequency-hopping patterns in each optimal frequency-hopping pattern family by virtue of $\tau_{max} \leq w_1 - 1$; and determining the number $s_1$ of the frequency-hopping patterns in each optimal frequency-hopping pattern family according to the number of users in a cell, wherein the number $s_1$ of the frequency-hopping patterns in each optimal frequency-hopping pattern family being not less than the number of users in the cell; and determining q according to the minimum Doppler distance w between the optimal frequency-hopping pattern families, the number s of the optimal frequency-hopping pattern families, the minimum delay distance $w_1$ between the frequency-hopping patterns in the optimal frequency-hopping pattern family, and the number $s_1$ of the frequency-hopping patterns in the optimal frequency-hopping pattern family, where $q=p^n$, p being a prime number and n being a positive integer, and $w \cdot s \leq q-1$ and $w_1 \cdot s_1 \leq q-1$; and after q is determined, determining the order N of the Golomb Costas array, where $N=q-2$; if $n=1$, the Golomb Costas array is constructed based on a prime field, or otherwise, the Golomb Costas array is constructed based on the extension field.

Further, the constructing the Golomb Costas array based on the extension field is specifically as follows:

constructing a finite field GF(q), where $q=p^n$, p being a prime number and n being a positive integer; α and β are primitive elements of GF(q), and an array A is a permutation array of order $N=q-2$, wherein the necessary and sufficient condition for the array A to be a Golomb Costas array is that the placement function of the array A is:

$$y(k) = \log_\beta(1 - \alpha^k), 1 \leq k \leq q - 2;$$

$$\text{where } \alpha^k + \beta^{y(k)} = 1, 1 \leq k \leq q - 2;$$

when $n=1$, p divides $\alpha^k + \beta^{y(k)} - 1$; when $n > 1$, f(x) divides $\alpha^k + \beta^{y(k)} - 1$, where f(x) is any irreducible polynomial of degree n over $GF(p) = \mathbb{Z}_p$, with $\mathbb{Z}_p$ indicating a residue class field modulo p, and p being a prime number;

for $n>1$, determining a value of n; determining an irreducible polynomial f(x) of degree n over GF(p), constructing the extension field $GF(p^n)$ and determining primitive elements α and β thereof, and determining coordinates (k, y(k)) according to y(k); and obtaining the Golomb Costas array according to the coordinates (k, y(k)).

Further, the generating the family head frequency-hopping pattern of an optimal frequency-hopping pattern family is specifically as follows:

adding an "empty" column at column $k=N+1$, and an "empty" row $y(k)=N+1$, to the Golomb Costas array A of order $N=q-2$, we transform array A into $A_1$ of order $N+1$, with the following placement function:

$$y_1(k) = \log_\beta(1 - \alpha^k), 1 \leq k \leq q - 1;$$

assuming that there are s optimal frequency-hopping pattern families, and the minimum Doppler distance between the families is w, w being a positive integer, enabling w and s to meet $$w \cdot s \leq q - 1;$$

performing the cyclic shift on the array $A_1$ by w, 2w, ..., and (s−1)w rows respectively in the vertical direction, to obtain s−1 arrays with 1-gap row and 1-gap column $A_2, A_3, \ldots$, and $A_s$ respectively, where the corresponding placement functions are respectively as follows:

$$y_2(k) = w + \log_\beta(1 - \alpha^k), 1 \leq k \leq q - 1;$$
$$y_3(k) = 2w + \log_\beta(1 - \alpha^k), 1 \leq k \leq q - 1;$$
$$\vdots$$
$$y_s(k) = (s - 1)w + \log_\beta(1 - \alpha^k), 1 \leq k \leq q - 1;$$

the arrays $A_1, A_2, \ldots$, and $A_s$ form the s family head frequency-hopping patterns.

Further, the generating other frequency-hopping patterns in each optimal frequency-hopping pattern family from the family head frequency-hopping pattern is specifically as follows:

obtaining the other frequency-hopping patterns in each optimal frequency-hopping pattern family by the cyclic shift of the family head frequency-hopping pattern of the optimal frequency-hopping pattern family in the horizontal direction, where the placement function of each frequency-hopping pattern in the ith family is expressed as follows:

$$y_{i,m_i}(k) = (i - 1)w + \log_\beta(1 - \alpha^{(m_i - 1)w_1} \cdot \alpha^k);$$

where k is the time and $1 \leq k \leq q-1$; α and β are primitive elements of the finite field GF(q); $i=1, 2, \ldots, s$; $m_i=1, 2, \ldots, s_1$; $w_1$ is a positive integer and represents the minimum delay distance between the frequency-hopping patterns in each family, and the number of the frequency-hopping patterns in each family is $s_1$, where $$w_1 \cdot s_1 \leq q - 1;$$

where $q=p^n$, p being a prime number, n being a positive integer, and a relation between q and the order N of the Golomb Costas array is $N=q-2$.

Further, in the cellular mobile communication system, reuse of identical optimal frequency-hopping patterns is adopted, and the reuse distance D of the optimal frequency-hopping patterns is:

$$D = \sqrt{3M}\,R;$$

where R is the cell radius, M is the number of cells in the cluster, and $M=i^2+j^2+ij$, $i=0, 1, 2, \ldots$; $j=1, 2, \ldots$.

The present invention has the following advantageous effects:

1. Such a PDMA communication system based on optimal frequency-hopping patterns employs a new two-dimensional orthogonal multiple access technology, namely, the PDMA technology, that is different from the three one-dimensional orthogonal multiple access technologies: FDMA, TDMA, and CDMA; and can effectively reduce or eliminate the interference caused by multipath propagation and Doppler shift and the interference between users, thus reducing the bit error rate and improving system capacity and communication quality.
2. Such a PDMA communication system based on optimal frequency-hopping patterns uses optimal frequency-hopping patterns to control carrier frequency hopping. Because the optimal frequency-hopping patterns have ideal autocorrelation and cross-correlation properties and are two-dimensionally orthogonal, the interference caused by multipath delay and Doppler shift and the interference between users can be effectively reduced or eliminated when two-dimensional receiving is used for the receiving end.
3. The present invention first proposes applying the optimal frequency-hopping patterns in the cellular mobile communication system, and generates frequency-hopping patterns of users in the system based on the architecture of the cellular mobile communication system, such that the users in the mobile communication system are avoided from the interference caused by multipath propagation and Doppler shift and the interference between the users, thus realizing PDMA communication.

BRIEF DESCRIPTION OF THE DRAWINGS

FIGS. 1a and 1b are schematic illustrative diagrams of a PDMA communication system based on optimal frequency-hopping patterns according to an embodiment of the present invention, where

FIGS. 2a, 2b, 2c, 2d, and 2e are schematic illustrative diagrams of a Golomb Costas array based on an extension field and family head frequency-hopping patterns of optimal frequency-hopping pattern families in the embodiment, where FIG. 2a shows a Golomb Costas array A based on an extension field.

FIGS. 3a, 3b, 3c, and 3d are schematic illustrative diagrams of four frequency-hopping patterns in an optimal frequency-hopping pattern family in the embodiment, where

DESCRIPTION OF THE EMBODIMENTS

Preferred embodiments of the present invention are described in detail below with reference to the accompanying drawings.

Embodiment

Figure 1A:
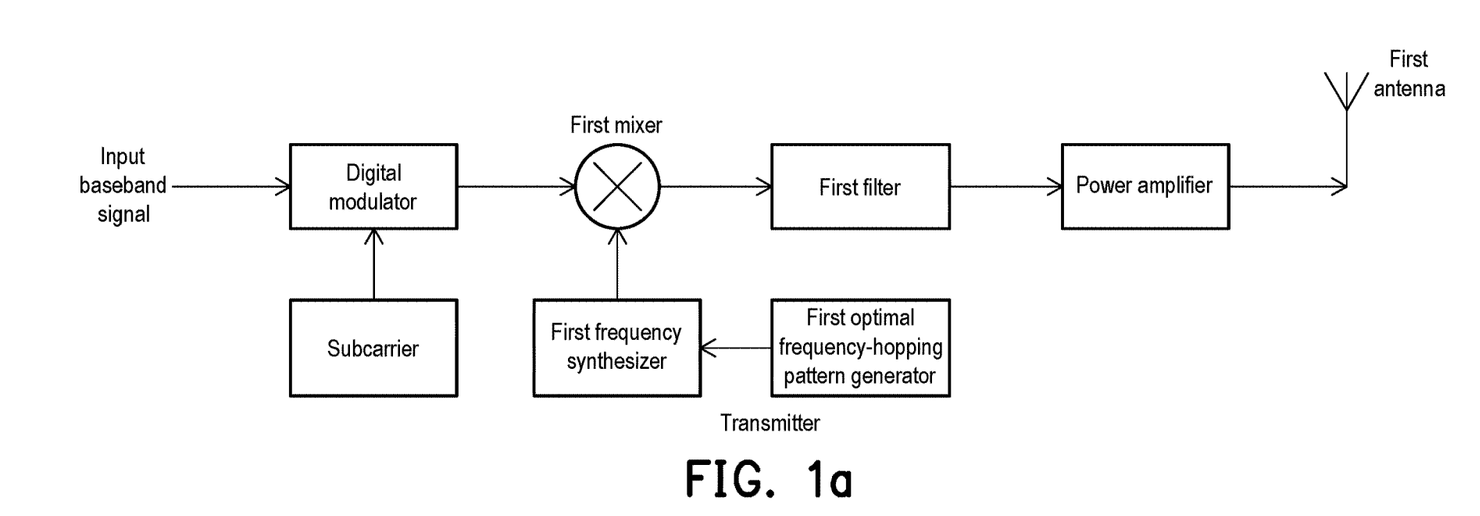
FIG. 1a is a schematic illustrative diagram of a transmitter.
Figure 1B:
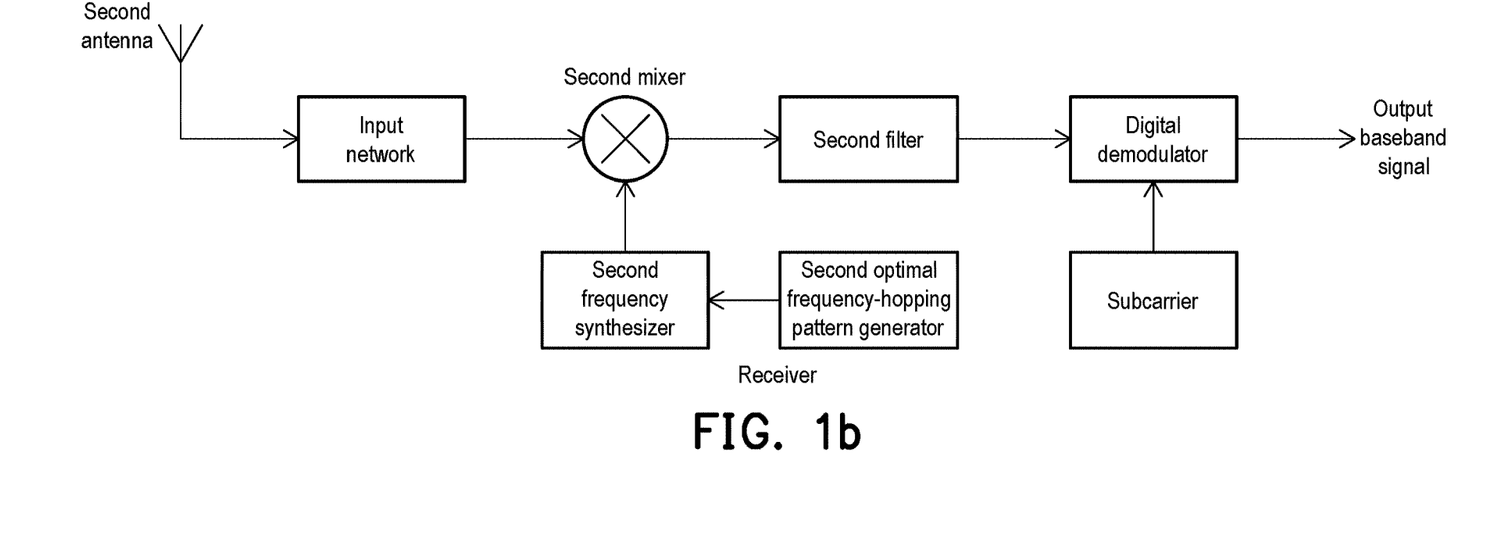
FIG. 1b is a schematic illustrative diagram of a receiver.

A PDMA communication system based on optimal frequency-hopping patterns, as shown in FIGS. 1a and 1b, includes a transmitter and a receiver. The transmitter modulates an input baseband signal into a modulated signal, and then converts the modulated signal into a frequency-hopping signal that hops according to the optimal frequency-hopping pattern. The receiver reverts the received frequency-hopping signal to an output modulated signal using an optimal frequency-hopping pattern same as that of the transmitter, and then demodulates the modulated signal into a baseband signal. The optimal frequency-hopping patterns are obtained by applying two-dimensional cyclic shift to a Golomb Costas array constructed based on an extension field, and thus are frequency-hopping patterns with ideal autocorrelation and cross-correlation properties. Such a PDMA communication system based on optimal frequency-hopping patterns employs a two-dimensional orthogonal multiple access technology, namely, a PDMA technology, that is different from the three one-dimensional orthogonal multiple access technologies: FDMA, TDMA, and CDMA, and can effectively reduce or eliminate the interference caused by multipath propagation and Doppler shift and the interference between users, thus reducing the bit error rate and improving system capacity and communication quality.

As shown in FIG. 1a, the transmitter includes a first optimal frequency-hopping pattern generator, a first frequency synthesizer, a digital modulator, a first mixer, a first filter, a power amplifier, and a first antenna.

The first optimal frequency-hopping pattern generator is configured to generate an optimal frequency-hopping pattern.

The first frequency synthesizer is configured to map the optimal frequency-hopping pattern into a frequency-hopping carrier such that an original constant frequency carrier is replaced with a hopping frequency carrier.

The digital modulator is configured to modulate an input digital baseband signal.

The first mixer is configured to perform frequency mixing on a first local frequency-hopping signal and a modulated signal output by the digital modulator, and move the frequency spectrum of the modulated signal onto the frequency-hopping carrier.

The first filter is configured to filter out harmonics and clutter from a signal output by the first mixer.

The power amplifier is configured to amplify a signal output by the first filter, the amplified output signal being radiated by the first antenna.

As shown in FIG. 1b, the receiver includes a second antenna, a second optimal frequency-hopping pattern generator, a second frequency synthesizer, a second mixer, a second filter, and a digital demodulator.

The second optimal frequency-hopping pattern generator is configured to generate an optimal frequency-hopping pattern same as that of the transmitter.

The second frequency synthesizer is configured to map the optimal frequency-hopping pattern into a frequency-hopping carrier such that an original constant frequency carrier is replaced with a hopping frequency carrier.

The second mixer is configured for moving a frequency spectrum, to move the signal spectrum back to the subcarrier without distortion.

The second filter is configured to filter out harmonics and clutter from a signal output by the second mixer.

The digital demodulator is configured to demodulate a signal output by the second filter, to output a digital baseband signal.

In such a PDMA communication system based on optimal frequency-hopping patterns, the optimal frequency-hopping patterns are obtained by applying two-dimensional cyclic shift to a Golomb Costas array constructed based on an extension field, which is specifically as follows:

S1. The order of a Golomb Costas array is determined, and the Golomb Costas array is constructed based on an extension field.

In step S1, the determining the order N of the Golomb Costas array is specifically as follows:

S11. For application in a cellular mobile communication system, according to the maximum Doppler shift $d_{max}$ of the cellular mobile communication system with $d_{max}$ being a nonnegative integer, the minimum Doppler distance w between optimal frequency-hopping pattern families is determined by virtue of $d_{max} \leq w-1$; and the number s of the optimal frequency-hopping pattern families is determined according to the number of cells in a cluster, where the number s of the optimal frequency-hopping pattern families is not less than the number of cells in the cluster.

S12. According to the maximum multipath delay $\tau_{max}$ in a cell with $\tau_{max}$ being a nonnegative integer, the minimum delay distance $w_1$ between frequency-hopping patterns in each optimal frequency-hopping pattern family is determined by virtue of $\tau_{max} \leq w_1-1$; and the number $s_1$ of the frequency-hopping patterns in each optimal frequency-hopping pattern family is determined according to the number of users in a cell, where the number $s_1$ of the frequency-hopping patterns in each family is not less than the number of users in the cell.

S13. q is determined according to the minimum Doppler distance w between the optimal frequency-hopping pattern families, the number s of the optimal frequency-hopping pattern families, the minimum delay distance $w_1$ between the frequency-hopping patterns in the optimal frequency-hopping pattern family, and the number $s_1$ of the frequency-hopping patterns in the optimal frequency-hopping pattern family that are obtained in steps S11 and S12, where $q=p^n$, p being a prime number and n being a positive integer, and q needs to meet both $w \cdot s \leq q-1$ and $w_1 \cdot s_1 \leq q-1$. After q is determined, the order N of the Golomb Costas array can be determined, where $N=q-2$. If $n=1$, i.e. $q=p$, then, the Golomb Costas array is constructed based on a prime field, or otherwise, the Golomb Costas array is constructed based on an extension field.

S14. A finite field GF(q) is constructed, where $q=p^n$, p being a prime number and n being a positive integer; let α, β be primitive elements of GF(q), and let an array A be a permutation array of order $N=q-2$, then the necessary and sufficient condition for the array A to be a Golomb Costas array is that the placement function of the array A is:

$$y(k) = \log_\beta(1-\alpha^k), 1 \leq k \leq q-2 \quad (1)$$

where the implicit function of (1) is expressed as follows:

$$\alpha^k + \beta^{y(k)} = 1, 1 \leq k \leq q-2 \quad (2)$$

and the explicit function of (2) is expressed as (1). When $n=1$ (i.e., $q=p$), (2) asserts that $\alpha^k+\beta^{y(k)} \equiv 1 \pmod{p}$. When $n>1$, (2) states that $\alpha^k+\beta^{y(k)} \equiv 1 \pmod{f(x)}$, where $f(x)$ is an irreducible polynomial of degree n over the finite field GF(p), with p being a prime number.

S15. For $n>1$, a value of n is determined. An irreducible polynomial f(x) of degree n over GF(p) is determined, an extension field $GF(p^n)$ is constructed and primitive elements α, β thereof are determined, and coordinates (k,y(k)) are determined according to (2) in step S14.

S16. The Golomb Costas array is obtained according to the coordinates (k, y(k)) determined in step S15, where k=1, 2, ..., N.

S2. The family head frequency-hopping pattern of an optimal frequency-hopping pattern family is generated.

S21. An "empty" column at column $k=N+1$, and an "empty" row at row $y(k)=N+1$ are added to the Golomb Costas array A of order $N=q-2$ constructed in step S1, so that the array A is changed into an array $A_1$ of order N+1, with the placement function as follows:

$$y_1(k) = \log_\beta(1-\alpha^k), 1 \leq k \leq q-1 \quad (3)$$

S22. Assuming that there are s optimal frequency-hopping pattern families, and the minimum Doppler distance between the families is w, w being a positive integer, w and s are enabled to meet (4):

$$w \cdot s \leq q-1 \quad (4)$$

S23. The cyclic shift is performed on the array $A_1$ obtained in step S21 by w, 2w, ..., and (s−1)w rows respectively in the vertical direction, to obtain s−1 arrays with 1-gap row and 1-gap column $A_2, A_3, ..., A_s$ respectively, where the corresponding placement functions are respectively as follows:

$$y_2(k) = w + \log_\beta(1-\alpha^k), 1 \leq k \leq q-1 \quad (5)$$

$$y_3(k) = 2w + \log_\beta(1-\alpha^k), 1 \leq k \leq q-1 \quad (6)$$

$$\vdots$$

$$y_s(k) = (s-1)w + \log_\beta(1-\alpha^k), 1 \leq k \leq q-1 \quad (7)$$

S24. the arrays $A_1, A_2, ..., A_s$ form the s family head frequency-hopping patterns, where the array $A_1$ obtained from step S21 and the arrays $A_2, A_3, ..., A_s$ obtained from step S23.

S3. Other frequency-hopping patterns in each optimal frequency-hopping pattern family are generated from the family head frequency-hopping pattern obtained in step S2.

The frequency-hopping patterns in each family are obtained by the cyclic shift of the family head frequency-hopping pattern in the horizontal direction, where the placement function of each frequency-hopping pattern in the ith (i=1, 2, . . . , s) family may be expressed as follows:

$$y_{i,m_i}(k) = (i-1)w + \log_\beta\left(1 - \alpha^{(m_i-1)w_1} \cdot \alpha^k\right) \quad (8)$$

where k is the time and $1 \leq k \leq q-1$; $\alpha$ and $\beta$ are primitive elements of the finite field GF(q); i=1, 2, . . . , s; $m_i$=1, 2, . . . , $s_1$; $w_1$ is a positive integer and represents the minimum delay distance between the frequency-hopping patterns in each family, and the number of the frequency-hopping patterns in each family is $s_1$, and then $w_1$ and $s_1$ need to meet (9):

$$w_1 \cdot s_1 \leq q - 1 \quad (9)$$

where $q=p^n$, p being a prime number and n being a positive integer, and the relation between q and the order N of the Golomb Costas array is N=q−2.

In such a PDMA communication system based on optimal frequency-hopping patterns, optimal frequency-hopping patterns are constructed by two-dimensional cyclic shift based on an algebraically constructed Costas array, and have ideal autocorrelation and cross-correlation, avoiding the problem that the Costas array does not have ideal cross-correlation. The optimal frequency-hopping patterns constructed according to the method in the embodiment are applicable to a scenario which requires a plurality of frequency-hopping patterns with ideal autocorrelation and cross-correlation properties, and especially, applicable to a cellular mobile communication system which requires a large number of frequency-hopping patterns with ideal autocorrelation and cross-correlation properties, thus solving the problem that the existing Costas array cannot meet the requirements.

The PDMA communication system based on optimal frequency-hopping patterns first proposes applying the optimal frequency-hopping patterns to a cellular mobile communication system, and generates frequency-hopping patterns of users in the system based on the architecture of the cellular mobile communication system, such that the users in the mobile communication system are avoided from the interference caused by multipath propagation and Doppler shift and the interference between the users, thus realizing PDMA communication.

The above introduces the construction of the optimal frequency-hopping patterns based on a Golomb Costas array by two-dimensional cyclic shift. The optimal frequency-hopping patterns have the following properties: if the Doppler distance between two frequency-hopping patterns is greater than the maximum Doppler shift (the Doppler shift is normalized by the frequency interval $\Delta f$ in frequency-hopping) in the system, these two frequency-hopping patterns have ideal cross-correlation no matter how much the multipath delay is; if the delay distance between the two frequency-hopping patterns is greater than the maximum multipath delay (the multipath delay is normalized by the time slot $T_b=1/\Delta f$ in frequency-hopping), these two frequency-hopping patterns have ideal cross-correlation no matter how much the Doppler shift is. According to the properties of the optimal frequency-hopping patterns, frequency-hopping patterns of the users in the cellular mobile communication system are designed below based on the system architecture.

In the cellular mobile communication system, the uplink and downlink carriers may hop in different frequency bands that do not interfere with each other. The uplink carrier may use the optimal frequency-hopping patterns based on the Golomb Costas array generated by primitive elements $\alpha$ and $\beta$, and the downlink carrier may use the optimal frequency-hopping patterns based on the Golomb Costas array generated by primitive elements $\alpha$ and $\beta^{-1}$. It should be noted that, in the same system, all the optimal frequency-hopping patterns must have the same model (or size). Then, taking the uplink carrier as an example, frequency-hopping patterns of the cell users are designed below based on the architecture of the cellular system. Because reuse technology of the same frequency-hopping pattern can be used in the cellular system, it is only necessary to design frequency-hopping patterns of cell users in one cluster. The reuse distance D of the optimal frequency-hopping patterns may be expressed as follows:

$$D = \sqrt{3M} R \quad (10)$$

where R is the cell radius, M is the number of cells in the cluster, and $M=i^2+j^2+ij$, i=0, 1, 2, . . . ; j=1, 2, . . . .

In the cellular mobile communication system, users in the same cell use frequency-hopping patterns of the same family. Therefore, the number s of the required optimal frequency-hopping pattern families should not be less than the number M of cells in a cluster.

The above describes the steps of generating the optimal frequency-hopping patterns in the cellular mobile communication system, and the generation of optimal frequency-hopping patterns based on the Golomb Costas array is described below by means of an example, to generate frequency-hopping patterns of the users in the cellular mobile communication system, thus realizing PDMA communication. In the following example, the Golomb Costas array is constructed based on an extension field.

It is assumed that there are three cells in a cluster of the cellular system, the maximum Doppler shift in the system is $d_{max}=1$, and the maximum delay in a cell is $\tau_{max}=0$. According to (11), let the minimum Doppler distance between the optimal frequency-hopping pattern families be w=2; and according to (12), let the minimum delay distance between the frequency-hopping patterns in the same family be $w_1=1$.

$$d_{max} \leq w - 1 \quad (11)$$

$$\tau_{max} \leq w_1 - 1 \quad (12)$$

Let p=3, n=2, and $q=3^2=9$. Then $GF(3^2)$ has four primitive elements as $\phi(q-1)=\phi(8)=4$, where $\phi(\cdot)$ is the Euler phi function. In order to construct the Golomb Costas array based on the extension field $GF(3^2)$, it is required to construct a specific extension field $GF(3^2)$ and determine primitive elements thereof. To construct this specific extension field, it is required to determine a monic irreducible polynomial f(x) of degree 2 over GF(3). There are in total three monic irreducible polynomials of degree 2 over GF(3), which are $x^2+2x+2$, $x^2+x+2$, and $x^2+1$, where $x^2+2x+2$ and $x^2+x+2$ are two primitive polynomials and $x^2+1$ is a non-primitive polynomial. Let $f(x)=x^2+x+2$, and then the primitive elements of $GF(3^2)$ and powers of the primitive elements are listed in Table 1.

TABLE 1

Primitive elements in $GF(3^2)$ and powers of primitive elements
$(f(x) = x^2 + x + 2)$

| $\alpha = \beta^3 = x$ | $\beta = \alpha^3 = 2x + 2$ | $\rho = \alpha^7 =$ $\alpha^{-1} = x + 1$ | $\sigma = \rho^3 =$ $\beta^{-1} = 2x$ |
|---|---|---|---|
| $\alpha^2 = 2x + 1$ | $\beta^2 = x + 2$ | $\rho^2 = x + 2$ | $\sigma^2 = 2x + 1$ |
| $\alpha^3 = 2x + 2$ | $\beta^3 = x$ | $\rho^3 = 2x$ | $\sigma^3 = x + 1$ |
| $\alpha^4 = 2$ | $\beta^4 = 2$ | $\rho^4 = 2$ | $\sigma^4 = 2$ |
| $\alpha^5 = 2x$ | $\beta^5 = x + 1$ | $\rho^5 = 2x + 2$ | $\sigma^5 = x$ |
| $\alpha^6 = x + 2$ | $\beta^6 = 2x + 1$ | $\rho^6 = 2x + 1$ | $\sigma^6 = x + 2$ |
| $\alpha^7 = x + 1$ | $\beta^7 = 2x$ | $\rho^7 = x$ | $\sigma^7 = 2x + 2$ |
| $\alpha^8 = 1$ | $\beta^8 = 1$ | $\rho^8 = 1$ | $\sigma^8 = 1$ |

$\alpha=x$ and $\beta=2x+2$ are selected to construct the Golomb Costas array based on the extension field $GF(3^2)$. The following equation can be obtained from (2):

$$\beta^{y(k)} = 1 - \alpha^k = 1 + (3-1)\alpha^k = 1 + 2\alpha^k, 1 \le k \le 7 \quad (13)$$

where 3 in (13) is the characteristic of the extension field $GF(3^2)$.

The corresponding y(k) can be obtained from (13) and by looking up Table 1, where k=1, 2, ..., 7. The correspondence between k and y(k) is shown in Table 2.

TABLE 2

Correspondence between k and y(k)

| k | $\alpha^k$ | $\beta^{y(k)} = 1 - \alpha^k = 2\alpha^k + 1$ | y(k) |
|---|---|---|---|
| 1 | $\alpha = x$ | $\beta^6 = 2x + 1$ | 6 |
| 2 | $\alpha^2 = 2x + 1$ | $\beta^3 = x$ | 3 |
| 3 | $\alpha^3 = 2x + 2$ | $\beta^2 = x + 2$ | 2 |
| 4 | $\alpha^4 = 2$ | $\beta^4 = 2$ | 4 |
| 5 | $\alpha^5 = 2x$ | $\beta^5 = x + 1$ | 5 |
| 6 | $\alpha^6 = x + 2$ | $\beta = 2x + 2$ | 1 |
| 7 | $\alpha^7 = x + 1$ | $\beta^7 = 2x$ | 7 |

Figure 2A:
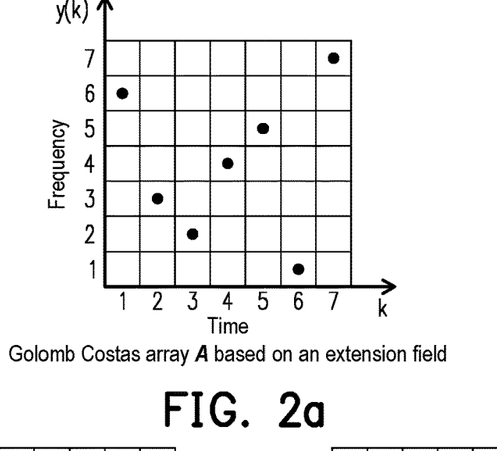
Figure 2B:
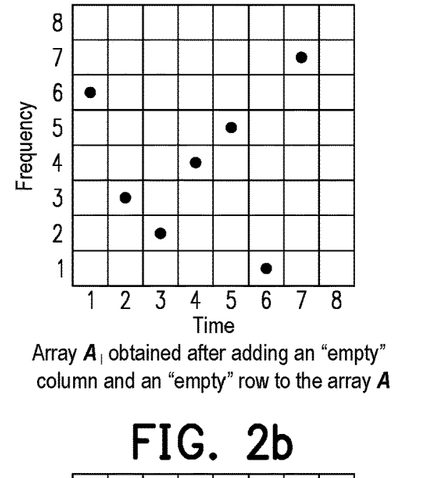
FIG. 2b shows an array $A_1$ obtained after adding an "empty" column and an "empty" row to the array A.
Figure 2C:
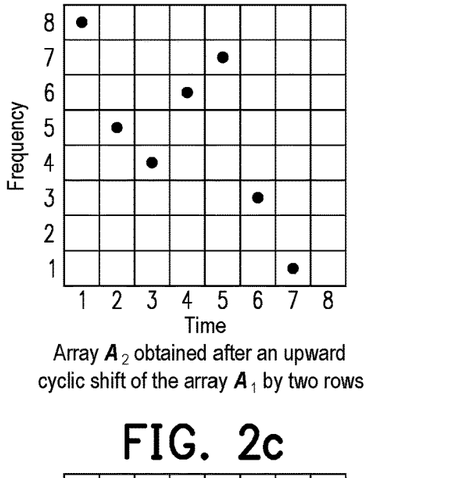
FIG. 2c shows an array $A_2$ obtained after an upward cyclic shift of the array $A_1$ by two rows.
Figure 2D:
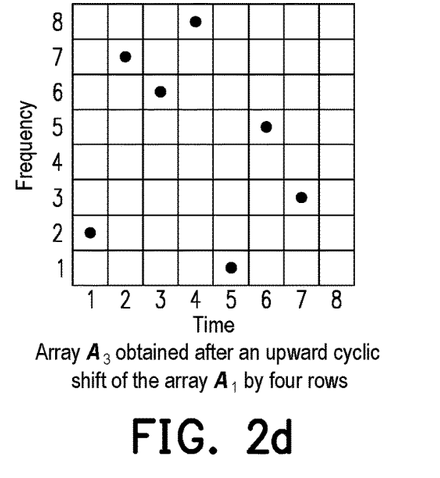
FIG. 2d shows an array $A_3$ obtained after an upward cyclic shift of the array $A_1$ by four rows.
Figure 2E:
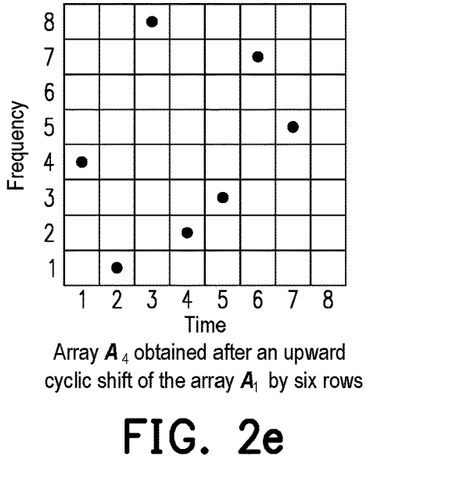
FIG. 2e shows an array $A_4$ obtained after an upward cyclic shift of the array $A_1$ by six rows.
Figure 3A:
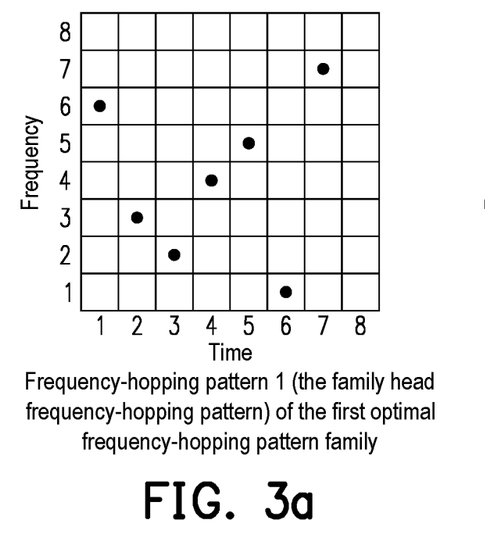
FIG. 3a shows the frequency-hopping pattern 1 (namely, the family head frequency-hopping pattern) in the first optimal frequency-hopping pattern family.
Figure 3B:
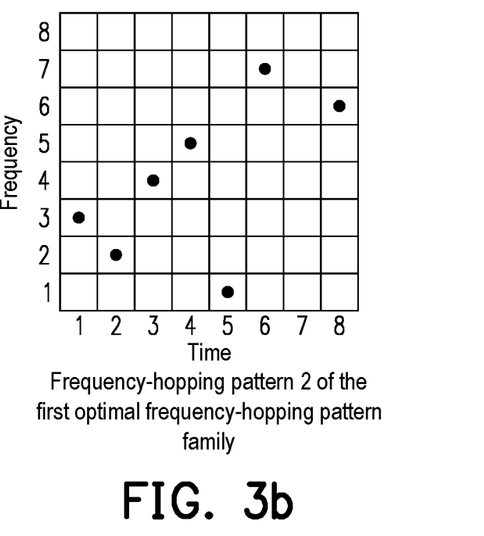
FIG. 3b shows the frequency-hopping pattern 2 in the first optimal frequency-hopping pattern family.
Figure 3C:
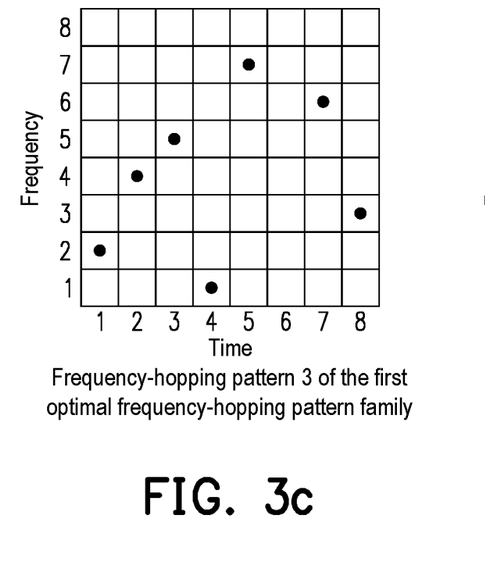
FIG. 3c shows the frequency-hopping pattern 3 in the first optimal frequency-hopping pattern family.
Figure 3D:
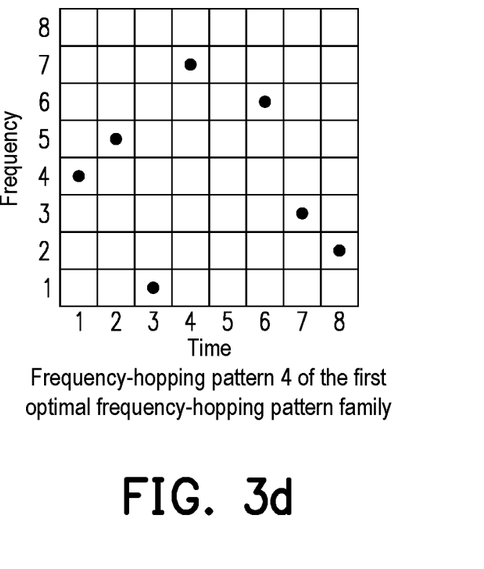
FIG. 3d shows the frequency-hopping pattern 4 in the first optimal frequency-hopping pattern family.

The Golomb Costas array is drawn based on the coordinates (k, y(k)), k=1, 2, ..., 7, as shown in FIG. 2a.

In order to meet (4) and (9), s=4 and $s_1=8$ are taken. That is, all the frequency-hopping patterns are grouped into 4 families, and each family has eight frequency-hopping patterns. Because there are three cells in a cluster of the system, the frequency-hopping patterns of three families may be allocated to the three cells respectively, and the frequency-hopping patterns of the remaining one family are used as standby frequency-hopping patterns. If required, all the standby frequency-hopping patterns ought to be applied in any of the three cells where the frequency-hopping patterns have been allocated, such that the number of frequency-hopping patterns of the cell is increased for more users.

FIGS. 2b, 2c, 2d, and 2e show four family head frequency-hopping patterns, where the array $A_1$ (FIG. 2b) is obtained by adding one "empty" column (the eighth column) and one "empty" row (the eighth row) to the Golomb Costas array A; and the array $A_2$ (FIG. 2c), the array $A_3$ (FIG. 2d), and the array $A_4$ (FIG. 2e) are obtained after upward cyclic shift of the array $A_1$ by two, four, and six rows respectively.

FIGS. 3a, 3b, 3c, and 3d show four frequency-hopping patterns in the first optimal frequency-hopping pattern family. It can be seen from FIGS. 3a, 3b, 3c, and 3d that, these four frequency-hopping patterns are respectively obtained after leftward cyclic shift of the family head frequency-hopping pattern of the first family by 0, 1, 2, and 3 columns. Note that there are in total eight frequency-hopping patterns in the first family, four frequency-hopping patterns of which are exemplified herein.

In such a PDMA communication system based on optimal frequency-hopping patterns, a method is proposed; in the method, optimal frequency-hopping patterns with ideal autocorrelation and cross-correlation properties are used to reduce and eliminate the interference caused by multipath delay and Doppler shift and the interference between users in the mobile communication system. By replacing an original constant carrier frequency with a changing carrier frequency, the users in the system perform frequency hopping communication according to predesigned orthogonal frequency-hopping patterns, thus overcoming the interference caused by multipath propagation and Doppler shift and the interference between the users.

In the cell-based mobile communication system, it is frequency that is allocated to users in the FDMA system, but it is frequency-hopping pattern that is allocated to users in the PDMA communication system. Based on the architecture of the cellular mobile communication system, the embodiment proposes reuse technology of the same frequency-hopping pattern in a cellular frequency-hopping system. When the distance between two users is greater than the protection distance of identical frequency-hopping patterns, the same frequency-hopping pattern can be used.

Figure 4:
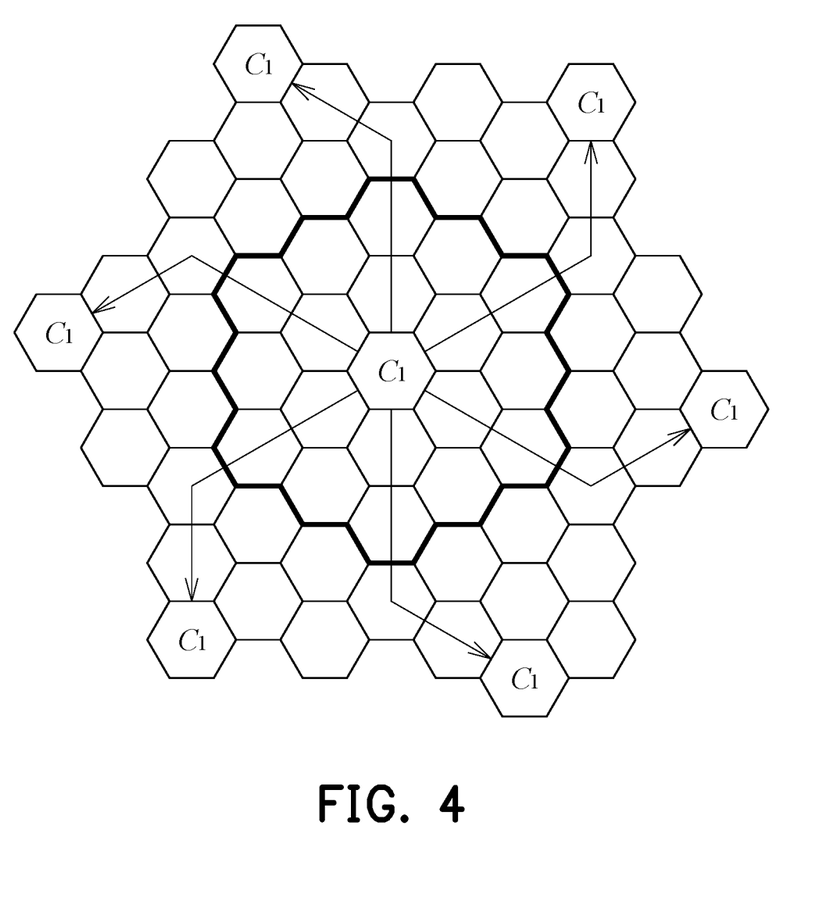
FIG. 4 is a schematic illustrative diagram of a cell cluster and the reuse of the same frequency-hopping pattern in a cellular system.

FIG. 4 illustrates the reuse of the same frequency-hopping pattern in a cellular mobile communication system with a cluster containing 19 cells ($M=i^2+ij+j^2$, where i=2 and j=3), and the same frequency-hopping pattern can be reused in the cell $C_1$.

In such a PDMA communication system based on optimal frequency-hopping patterns, the optimal frequency-hopping patterns are constructed based on an extension field. The inventors have proved that an algebraic structure proposed in the present invention is an extension field, and the primitive elements of the extension field have been calculated by writing computer programs, thus verifying the correctness of the construction method of the extension field.

Such a PDMA communication system based on optimal frequency-hopping patterns can eliminate or reduce the interference caused by multipath propagation and Doppler shift and the interference between users by means of PDMA based on the optimal frequency-hopping patterns, thus reducing the bit error rate and improving system capacity and communication quality. The future cellular mobile communication system (including systems such as B5G and 6G) should use the PDMA technology based on the optimal frequency-hopping patterns, which is a two-dimensional orthogonal multiple access technology that can effectively reduce or eliminate the interference caused by multipath delay and Doppler shift and the interference between users. As a two-dimensional orthogonal multiple access technology different from the three one-dimensional orthogonal multiple access technologies: FDMA, TDMA, and CDMA, such a PDMA communication system based on the optimal frequency-hopping patterns will have a significant and far-reaching impact on the future mobile communication.

The above description is only a preferred embodiment of the present invention, and is not intended to limit the present invention in any form. Although the present invention has been discussed above with the preferred embodiment, the present invention is not limited thereto. Any person skilled in the art can make some variations or modifications from the technical content disclosed above to form equivalent embodiments, without departing from the scope of the technical solution of the present invention. Any simple variations, equivalent changes and modifications made to the foregoing embodiment according to the technical essence of the present invention without departing from the content of the technical solution of the present invention shall fall within the scope of the technical solution of the present invention.

What is claimed is:

1. A pattern division multiple access communication system based on optimal frequency-hopping patterns, comprising a transmitter and a receiver, wherein the transmitter modulates an input baseband signal into a modulated signal, and then converts the modulated signal into a frequency-hopping signal that hops in frequency according to an optimal frequency-hopping pattern, the receiver reverts a received frequency-hopping signal to an output modulated signal using an optimal frequency-hopping pattern same as that of the transmitter, and then demodulates the output modulated signal into a baseband signal, where the optimal frequency-hopping patterns are obtained by applying two-dimensional cyclic shift to a Golomb Costas array constructed based on an extension field and thus are optimal frequency-hopping patterns with ideal autocorrelation and cross-correlation properties, wherein the optimal frequency-hopping patterns are obtained by applying the two-dimensional cyclic shift to the Golomb Costas array constructed based on the extension field, which is specifically as follows, S1. determining the order N of the Golomb Costas array, and constructing the Golomb Costas array based on the extension field, wherein the step S1, the determining the order N of the Golomb Costas array is specifically as follows:

S11. for application in a cellular mobile communication system, according to the maximum Doppler shift $d_{max}$ of the cellular mobile communication system with $d_{max}$ being a nonnegative integer, determining the minimum Doppler distance w between optimal frequency-hopping pattern families by $d_{max} \leq w-1$, determining the number s of the optimal frequency-hopping pattern families according to the number of cells in a cluster, the number s of the families being not less than the number of cells in the cluster;

S12. according to the maximum multipath delay $\tau_{max}$ in a cell with $\tau_{max}$ being a nonnegative integer, determining the minimum delay distance $w_1$ between frequency-hopping patterns in each optimal frequency-hopping pattern family by $\tau_{max} \leq w_1-1$, determining the number $s_1$ of the frequency-hopping patterns in each optimal frequency-hopping pattern family according to the number of users in a cell, the number $s_1$ of the frequency-hopping patterns in each family being not less than the number of users in the cell; and S13. determining q according to the minimum Doppler distance w between the optimal frequency-hopping pattern families, the number s of the optimal frequency-hopping pattern families, the minimum delay distance $w_1$ between the frequency-hopping patterns in an optimal frequency-hopping pattern family, and the number $s_1$ of the frequency-hopping patterns in the optimal frequency-hopping pattern family that are obtained in steps S11 and S12, where $q=p^n$, p being a prime number and n being a positive integer, q needs to meet both $w \cdot s \leq q-1$ and $w_1 \cdot s_1 \leq q-1$, after q is determined, determining the order N of the Golomb Costas array; N=q−2, where $q=p^n$, p being a prime number, n being a positive integer, if n=1, the Golomb Costas array is constructed based on a prime field, or otherwise, the Golomb Costas array is constructed based on the extension field;

S2. generating the family head frequency-hopping pattern of the optimal frequency-hopping pattern family; and S3. generating other frequency-hopping patterns in each optimal frequency-hopping pattern family from the family head frequency-hopping pattern obtained in step S2.

2. The pattern division multiple access communication system based on optimal frequency-hopping patterns of claim 1, wherein the transmitter comprises a first optimal frequency-hopping pattern generator, a first frequency synthesizer, a digital modulator, a first mixer, a first filter, a power amplifier, and a first antenna, the first optimal frequency-hopping pattern generator: for generating the optimal frequency-hopping pattern;

the first frequency synthesizer: "mapping" the optimal frequency-hopping pattern into a frequency-hopping carrier such that an original constant frequency carrier is replaced with a hopping frequency carrier under a control of the first optimal frequency-hopping pattern generator, to generate a first local frequency-hopping signal;

the digital modulator: for modulating an input baseband signal;

the first mixer: performing frequency mixing on the first local frequency-hopping signal and the modulated signal output by the digital modulator, to "move" a frequency spectrum of the modulated signal onto the frequency-hopping carrier;

the first filter: for filtering out harmonics and clutter from a signal output by the first mixer;

the power amplifier: amplifying a signal output by the first filter, where the obtained frequency-hopping signal is transmitted via the first antenna as a transmit signal.

3. The pattern division multiple access communication system based on optimal frequency-hopping patterns of claim 1, wherein the receiver comprises a second antenna, a second optimal frequency-hopping pattern generator, a second frequency synthesizer, a second mixer, a second filter, and a digital demodulator, the second optimal frequency-hopping pattern generator: generating the optimal frequency-hopping pattern same as that of the transmitter;

the second frequency synthesizer: "mapping" the optimal frequency-hopping pattern into a frequency-hopping carrier such that an original constant frequency carrier is replaced with a hopping frequency carrier under a control of the second optimal frequency-hopping pattern generator, to generate a second local frequency-hopping signal;

the second mixer: performing frequency mixing on the second local frequency-hopping signal and the frequency-hopping signal received by the second antenna, to move a signal spectrum back to the subcarrier without distortion;

the second filter: for filtering out harmonics and clutter from a signal output by the second mixer;

the digital demodulator: for demodulating a signal output by the second filter, to output a digital baseband signal.

4. The pattern division multiple access communication system based on optimal frequency-hopping patterns of claim 1, wherein in step S1, the constructing the Golomb Costas array based on the extension field is specifically as follows:

S14. constructing a finite field GF(q), q=$p^n$, p being a prime number and n being a positive integer; α and β are primitive elements of GF(q), and an array A is a permutation array of order N=q−2, wherein the necessary and sufficient condition for the array A to be a Golomb Costas array is that the placement function of the array A is $$y(k) = \log_\beta(1 - \alpha^k), \ 1 \le k \le q - 2 \qquad (1)$$

an implicit function of function (1) is expressed as follows $$\alpha^k + \beta^{y(k)} = 1, \ 1 \le k \le q - 2 \qquad (2)$$

when n=1, i.e., q=p, an explicit function of function (2) is expressed as function (1) indicating modulo p congruence; when n>1, function (2) indicates modulo f(x) congruence, where f(x) is any irreducible polynomial of degree n over GF(p)=$\mathbb{Z}_p$, with $\mathbb{Z}_p$ indicating a residue class field modulo p, and p being a prime number;

S15. for n>1, determining a value of n, determining an irreducible polynomial f(x) of degree n over GF(p), constructing the extension field GF($p^n$) and determining primitive elements α and β thereof, selecting the primitive elements α and β, determining coordinates (k, y(k)) according to function (2) in step S14;

S16. obtaining the Golomb Costas array according to the coordinates (k, y(k)) determined in step S15, k=1, 2, . . . , N.

5. The pattern division multiple access communication system based on optimal frequency-hopping patterns of claim 4, wherein in step S2, the generating the family head frequency-hopping pattern of an optimal frequency-hopping pattern family is specifically as follows, S21. adding an empty column i.e., column k=N+1 and an empty row i.e., row y(k)=N+1, to the Golomb Costas array A of order N=q−2 constructed in step S1, such that the array A is transformed into an array $A_1$ of order N+1, a placement function of the array $A_1$ is as follows:

$$y_1(k) = \log_\beta(1 - \alpha^k), \ 1 \le k \le q - 1 \qquad (3)$$

S22. assuming that there are s optimal frequency-hopping pattern families, the minimum Doppler distance between the families is w, w being a positive integer, w and s need to meet function (4):

$$w \cdot s \le q - 1 \qquad (4)$$

S23. performing the cyclic shift on the array $A_1$ obtained in step S21 by w, 2w, . . . , and (s−1)w rows respectively in the vertical direction, to obtain s−1 arrays with 1-gap row and 1-gap column $A_2, A_3, \ldots,$ and $A_s$ respectively, where corresponding placement functions are respectively as follows:

$$y_2(k) = w + \log_\beta(1 - \alpha^k), \ 1 \le k \le q - 1 \qquad (5)$$

$$y_3(k) = 2w + \log_\beta(1 - \alpha^k), \ 1 \le k \le q - 1 \qquad (6)$$

$$\vdots$$

$$y_s(k) = (s - 1)w + \log_\beta(1 - \alpha^k), \ 1 \le k \le q - 1 \qquad (7)$$

S24. the arrays $A_1$ obtained from step S21 and the arrays $A_2, \ldots,$ and $A_s$ obtained from step S23 form the s family head frequency-hopping patterns.

6. The pattern division multiple access communication system based on optimal frequency-hopping patterns of claim 1, wherein in step S3, the generating other frequency-hopping patterns in each optimal frequency-hopping pattern family from the family head frequency-hopping pattern obtained in step S2 is specifically as follows, obtaining the other frequency-hopping patterns in each optimal frequency-hopping pattern family by the cyclic shift of the family head frequency-hopping pattern of the optimal frequency-hopping pattern family in the horizontal direction, where the placement function of each frequency-hopping pattern in the ith family is expressed as follows $$y_{i,m_i}(k) = (i - 1)w + \log_\beta\left(1 - \alpha^{(m_i-1)w_1} \cdot \alpha^k\right) \qquad (8)$$

in function (8), k is the time and 1≤k≤q−1, α and β are primitive elements of the finite field GF(q), i=1, 2, . . . , s, $m_i$=0, 1, . . . , $s_1$−1, $w_1$ represents the minimum delay distance between the frequency-hopping patterns in each family, $w_1$ is a positive integer, and the number of the frequency-hopping patterns in each family is $s_1$, $w_1$ and $s_1$ need to meet function (9)

$$w_1 \cdot s_1 \le q - 1 \qquad (9)$$

in function (9), q=$p^n$, p being a prime number, n being a positive integer, a relation between q and the order N of the Golomb Costas array is: N=q−2.

7. The pattern division multiple access communication system based on optimal frequency-hopping patterns of claim 1, wherein in the cellular mobile communication system, reuse of identical optimal frequency-hopping patterns is adopted, and the reuse distance D of the optimal frequency-hopping patterns is:

$$D = \sqrt{3M}\, R \qquad (10)$$

in the function, R is the cell radius, M is the number of cells in the cluster, M=$i^2$+$j^2$+ij, i=0, 1, 2, . . . ; j=1, 2, . . . .

\* \* \* \* \*